(12) United States Patent  
Kung

(10) Patent No.: US 6,490,020 B2  
(45) Date of Patent: Dec. 3, 2002

(54) TFTLCD FOR RECYCLING ELECTRICAL POWER

(75) Inventor: Jerry Ji-Ho Kung, Taoyuan (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 09/804,095

(22) Filed: Mar. 12, 2001

(65) Prior Publication Data

US 2002/0008796 A1 Jan. 24, 2002

(30) Foreign Application Priority Data

Jun. 14, 2000 (TW) .......................... 089111654

(51) Int. Cl.$^7$ ............................. G02F 1/13; G02F 1/35
(52) U.S. Cl. ...................... 349/117; 349/195; 349/199
(58) Field of Search .................... 349/141, 61, 24, 349/116, 195, 199

(56) References Cited

U.S. PATENT DOCUMENTS

| | | | | |
|---|---|---|---|---|
| 4,281,208 A | * | 7/1981 | Kuwano et al. | ............. 136/249 |
| 4,345,248 A | * | 8/1982 | Togashi et al. | ............. 340/784 |
| 5,149,351 A | * | 9/1992 | Yaba et al. | ................ 565/60.2 |
| 5,168,378 A | * | 12/1992 | Black et al. | ................. 359/38 |
| 5,322,996 A | * | 6/1994 | Black et al. | ................. 250/214 |
| 5,714,790 A | * | 2/1998 | Masaru | ....................... 257/440 |
| 6,043,971 A | * | 3/2000 | In-Duk et al. | .............. 361/111 |
| 6,111,626 A | * | 8/2000 | Makoto et al. | ............. 349/141 |
| 6,187,150 B1 | * | 2/2001 | Masashi et al. | ........ 204/192.29 |
| 6,236,441 B1 | * | 5/2001 | Aratani et al. | ................ 349/41 |

FOREIGN PATENT DOCUMENTS

| | | | |
|---|---|---|---|
| JP | 58170053 | * | 10/1983 |
| JP | 358170053 A | * | 10/1983 |
| JP | 361059433 A | * | 3/1986 |
| JP | 362123780 A | * | 6/1987 |
| JP | 409054342 A | * | 2/1997 |
| JP | 200019983 A | * | 1/2000 |

* cited by examiner

*Primary Examiner*—James Dudek  
*Assistant Examiner*—Hoan Nguyen  
(74) *Attorney, Agent, or Firm*—Volpe and Koenig, P.C.

(57) ABSTRACT

The present invention provides a thin film transistor liquid crystal display (TFTLCD) including a liquid crystal layer having a first region and a second region therein, a liquid crystal controlling device for controlling an anti-dazzling effect produced by the first region, and a photoelectric converting device having a conductive layout constituted on the second region for converting a portion of light energy passing through the liquid crystal layer into electric power to recycle the electric power.

21 Claims, 10 Drawing Sheets

TFTLCD FOR RECYCLING ELECTRICAL POWER

FIELD OF THE INVENTION

The present invention relates to a thin film transistor liquid crystal display (TFTLCD). More specially, the present invention relates to a device for an in-plane switch (IPS) TFTLCD to convert the light energy into an electrical power so as to recycle the electrical power.

BACKGROUND OF THE INVENTION

With the techniques of producing displays improved day-by-day, a TFTLCD is a widely applied display for a great deal of users to see pictures and information on a screen. The working principle of the TFTLCD is to alter the alignment of a great deal of liquid crystal molecules in a liquid crystal layer by applying an electric field to change the path of the light passing through the liquid crystal layer so as to express the anti-dazzling effects shown in a TFTLCD.

According the working principle described above, it is known that the light for display is provided by a backlight source, e.g. a transmission TFTLCD, or a nature light source, e.g. a reflection TFTLCD, instead of actively emitting light by liquid crystal particles themselves.

An electrical circuit of a conventional TFTLCD is shown in FIG. 1. A thin film transistor 11 can be switched in an on/off state controlled by a scanning-line voltage Vs. When a data-line voltage Vd is applied on the electrode 131 and the electrode 132, the alignment of the liquid crystal particles 12 will be altered for further controlling the penetrating degree of the light, and changing the light intensity emitted form the backlight source 14 to an observer.

FIG. 2(a) shows a top-view structure of a conventional TFTLCD composed of a top electrode and a bottom electrode and FIG. 2(b) shows a conventional in-plane switch (IPS) structure for improving the viewing angle shown by the TFTLCD. The respective controllable region 20 shown on FIG. 2(a) and FIG. 2(b) are used to produce the anti-dazzling effect controlled by an electric field. Except for the controlled region 20, the other region which is called an uncontrollable region cannot express the anti-dazzling effect. Hence, a lot of black matrixes are often used to cover the uncontrollable region so as to prevent the light from transmitted therethrough, and increase the contrast of pixels. Therefore, it is understood that the more controllable region 20 occupies in the TFTLCD, the greater of the liquid crystal molecules can be controlled by the electric field to express the anti-dazzling effect so as to reduce the manufacturing cost. However, the conventional TFT structure exists an uncontrollable region where the liquid crystal molecules are not controlled. In addition, the electrode structure and the working principle of the electric field in the IPS shown on FIG. 2(b) are different from those of the general TFTLCD consisting of the top electrode and the bottom electrode shown on FIG. 2(a).

Furthermore, The TFTLCD is usually applied to a portable computer, e.g. a notebook, which requires a battery as the power source. Consequently, saving electric power is important for designers to fabricate the TFTLCD. Moreover, the IPS TFTLCD consumes more electrical power than the conventional TFTLCD composed of the top and bottom electrodes, because the IPS TFTLCD needs a driving voltage at least greater than 12 V.

Therefore, it is attempted by the applicant to provide a TFTLCD for recycling electric power and being widely applied in different electrical products.

SUMMARY OF THE INVENTION

It is therefore an object of the present invention to provide a TFTLCD for recycling the light energy by converting apportion of light energy through a liquid crystal layer thereby into the electrical power.

It is therefore another object of the present invention to provide an TFTLCD including a liquid crystal layer having a first region and a second region therein, a liquid crystal controlling device for controlling an anti-dazzling effect in by the first region of the liquid crystal layer, and a photoelectric converting device disposed on the second region of the liquid layer for converting a portion of light energy passing through the liquid crystal layer into electrical power thereby recycling the light energy.

Preferably, the liquid crystal layer includes a plurality of liquid crystal molecules to be filled with the crystal layer between a first insulation substrate and a second insulation substrate.

Preferably, each of the first insulation substrate and the second insulation substrate is formed of a transparent glass substrate. The first region is a controllable region for an electrical filed to control the anti-dazzling effect. The second region is an uncontrollable region for setting the photoelectric converting device thereon.

Preferably, the liquid crystal controlling device includes a pixel electrode electrically connected to a transistor for providing an electric field to control the anti-dazzling effect, a thin film transistor (TFT) being the transistor to be electrically connected with the pixel electrode for selectively being turned on and off, a common electrode electrically connected with a end of the TFT.

Preferably, the TFT further has a gate end electrically connected with a scanning-line electrode to form the electric filed. The scanning-electrode is electrically connected to the common electrode for further electrically connecting with the pixel electrode to form the electric field. Each of the pixel electrode and the common electrode is formed of a comb-shaped pixel electrode and a comb-shaped common electrode, and each of the pixel electrode and the common electrode has a respective teeth set by extending into the intervals formed between the pixel electrode and the common electrode.

Preferably, the pixel electrode has a layout in a shape corresponding to the common electrode. The pixel electrode and the common electrode are transparency electrodes. And the transparent electrodes are made of a material selected from one of indium tin oxide (ITO) and lead tin oxide.

Preferably, the liquid crystal controlling device further includes a signal electrode and a scanning-line electrode to be respectively connected to a drain end and a gate end of the TFT.

Preferably, the photoelectric converting device is for a photovoltaic battery usage, including a first electrode, a photovoltaic unit disposed on the first electrode, a doped semiconductor structure formed on the photovoltaic unit, and a second electrode formed on the doped semiconductor structure.

Preferably, the photovoltaic unit is made of an ultrathin transparency film selected from one of polysilicon and amorphous polysilicon material.

Preferably, the doped semiconductor structure is made of a heavily-doped material selected from one of a group consisting of polysilicon, P type amorphous polysilicon and N type amorphous polysilicon material.

Preferably, the first electrode and the second electrode are transparent electrodes. And the transparency electrodes are formed of a same material as that of the pixel electrode and the common electrode selected from one of indium tin oxide (ITO) and lead tin oxide.

Preferably, the first electrode and the second electrode have a layout in a shape corresponding to a combination region of the comb-shaped pixel electrode and the comb-shaped common electrode.

It is therefore a further object of the present invention to provide an in-plane switch (IPS) TFTLCD including a first insulation substrate, a second insulation substrate, a liquid crystal layer filled between the first insulation substrate and the second insulation substrate therein, a plurality of scanning-line electrodes and a plurality of signal-line electrodes formed on a surface bounded between the first insulation substrate and the liquid crystal layer, a plurality of liquid crystal controlling devices respectively formed in the common border of the scanning-line electrodes and the signal-line electrodes for controlling an anti-dazzling effect of the liquid crystal layer. And each of the liquid crystal controlling units including a thin film transistor (TFT) electrically connected with the scanning-line electrodes and the signal-line electrodes, a comb-shaped pixel electrode and a corresponding comb-shaped common electrode having a respective teeth extending into the intervals formed between the comb-shaped pixel electrode and the corresponding comb-shaped common electrode, and a photoelectric converting device disposed between the first insulation substrate and the second insulation substrate and having a layout in a shape corresponding to a combination region of the comb-shaped pixel electrode and the comb-shaped common electrode.

Preferably, the first insulation substrate and the second insulation substrate are respectively made of a transparent glass substrate.

Preferably, each of the pixel electrode and the common electrode is formed of a transparent electrode.

Preferably, the TFT has a gate end electrically connected to an end of a corresponding one of the scanning-line electrodes and a drain end electrically connected to an end of a corresponding one of the signal electrodes.

A better understanding of the present invention can be obtained when the following detailed description of a preferred embodiment is considered in conjunction with the following drawings, in which:

DETAILED DESCRIPTION OF THE PREFERRED EMBODIMENTS

The liquid crystal layer in a TFTLCD is used to form a first region what is called a controllable region to be controlled by an electric field so as to produce the anti-dazzling effect displayed in the TFTLCD. In addition, there is a second region formed of an uncontrollable region that cannot control by the electric field.

The subject of the present invention is based on the power recycle idea to set a photoelectric converting device for converting a portion of the light energy passing through the second region into an electrical power thereby recycling the light energy stored in the uncontrollable region. The embodiments and the method described in the present invention can be performed in different type of LCD and is perfectly applied to an ISP TFTLCD. To vividly describe the preferred embodiment of the present invention, the following descriptions are based on the structure of an IPS TFTLCD.

Figure 1:
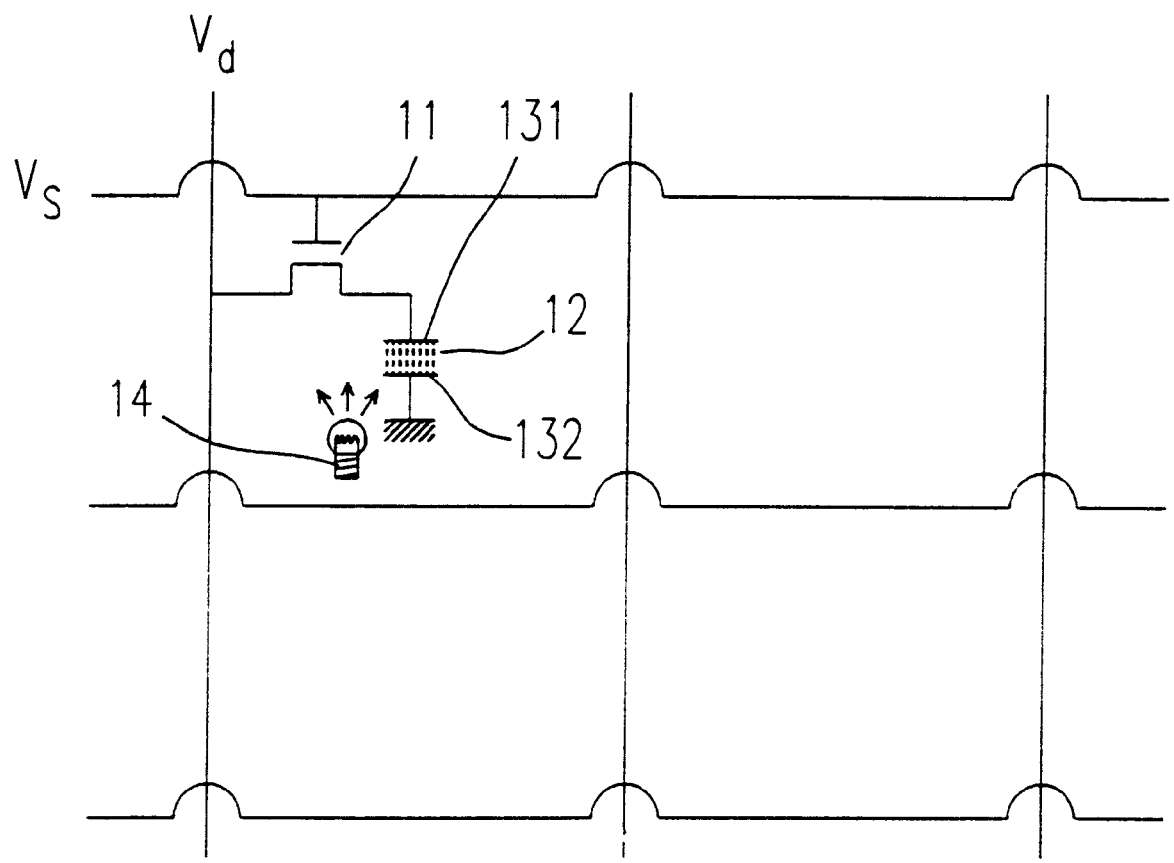
FIG. 1 is an electrical circuit of a conventional TFTLCD.
Figure 2A:
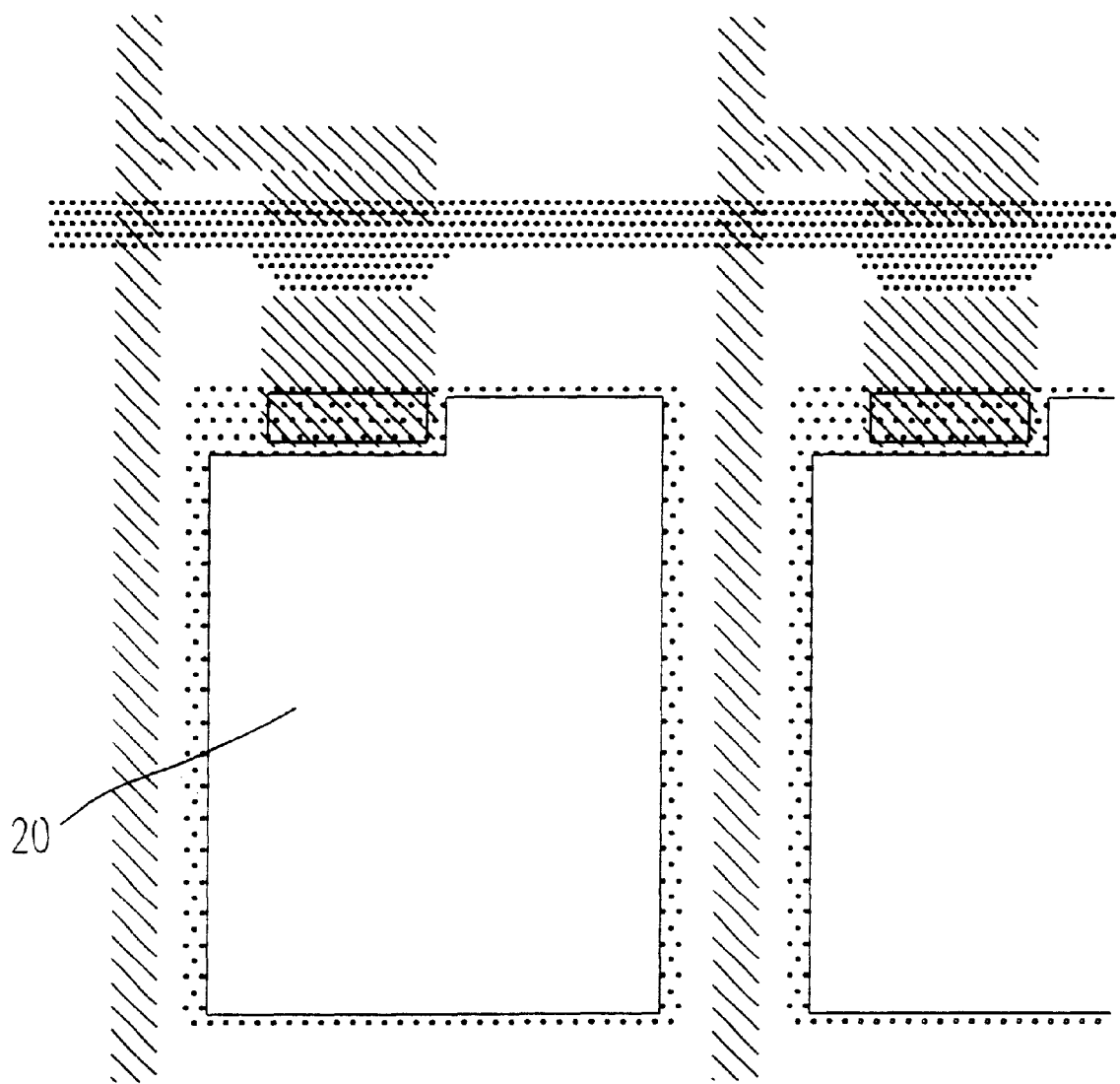
FIG. 2(a) and FIG. 2(b) are top views respectively showing the structure of two conventional TFTLCD.
Figure 2B:
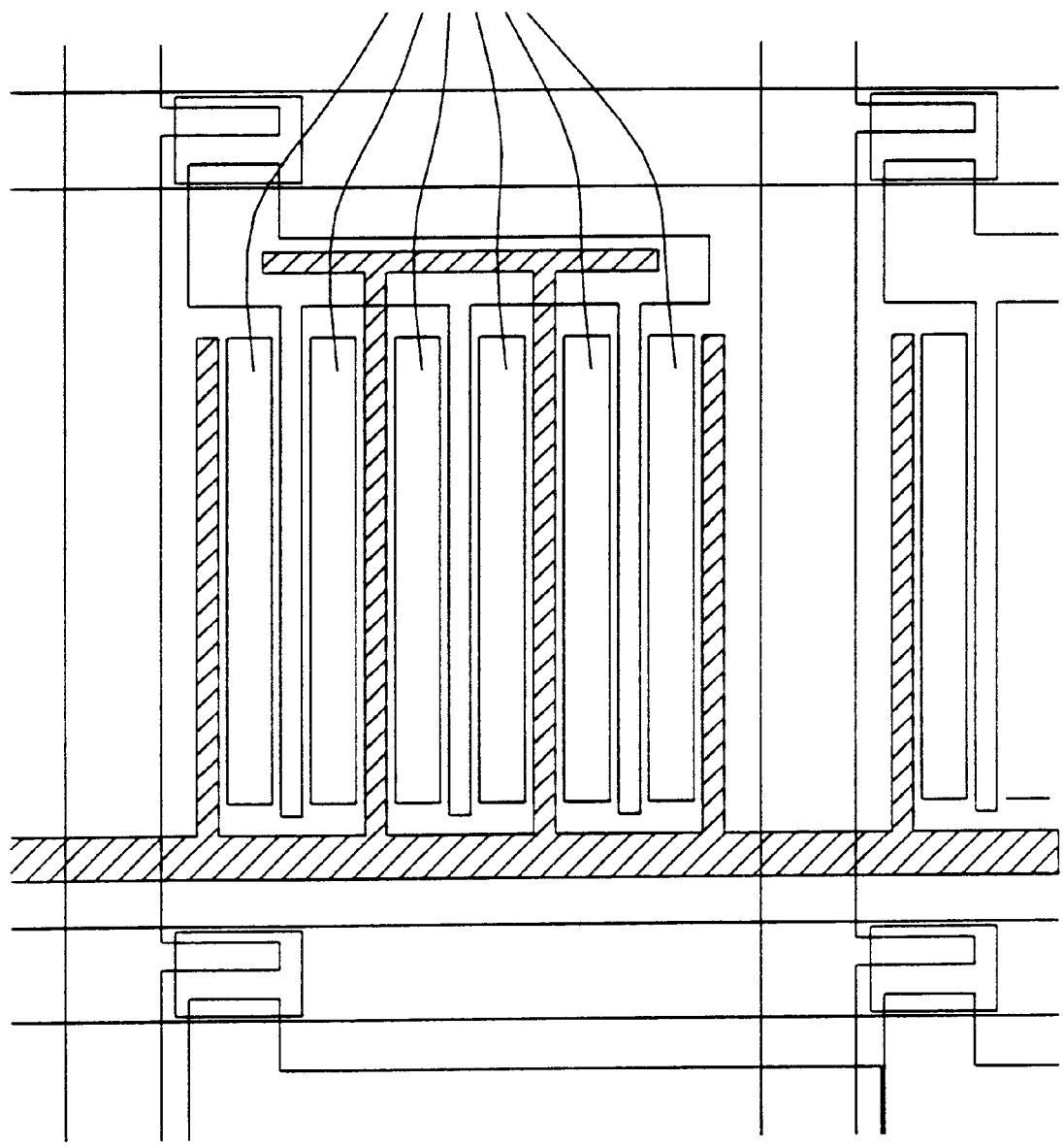
Figure 3A:
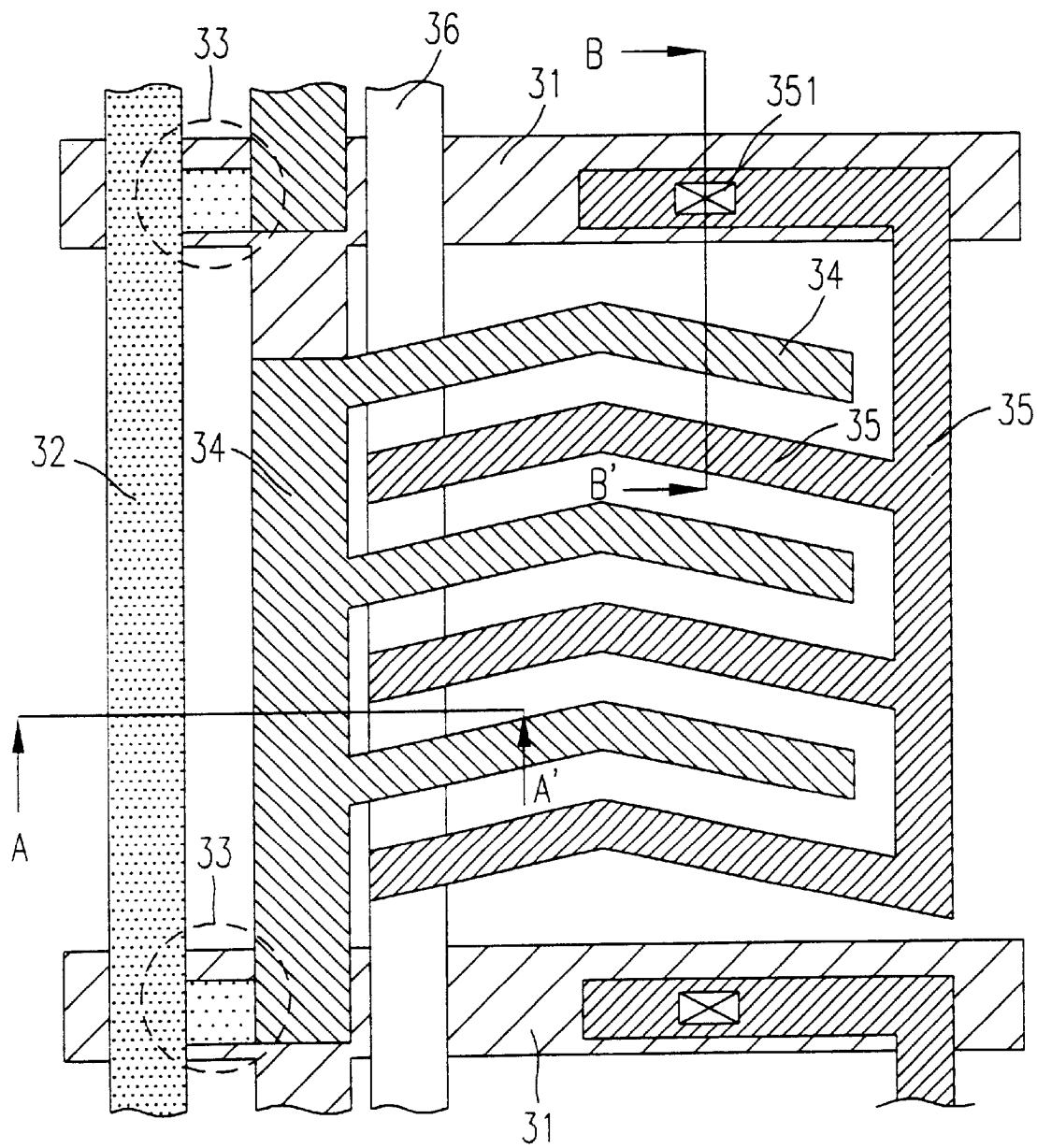
FIG. 3(a) is a top view showing the structure of an IPS TFTLCD according to a preferred embodiment of the present invention.
Figure 3B:
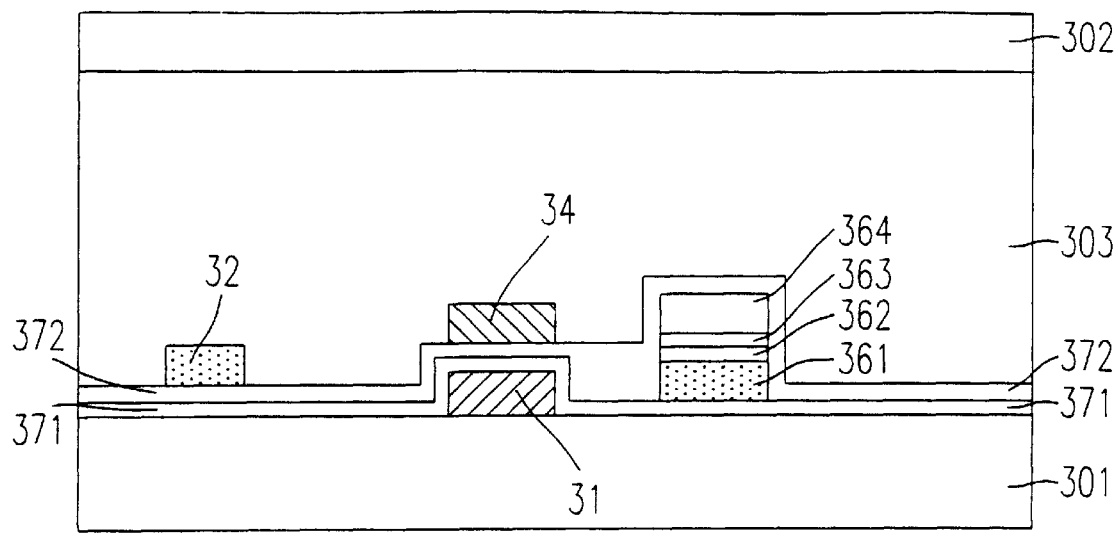
FIG. 3(b) is a cross-section view taken along line A–A' in FIG. 3(a)
Figure 3C:
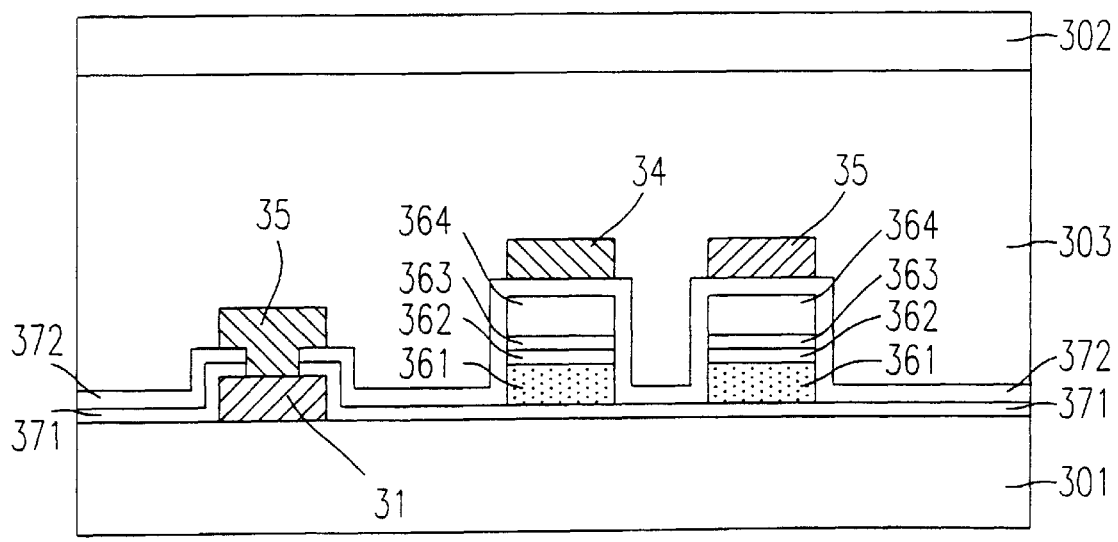
FIG. 3(c) is a cross-section view taken along line B–B' in FIG. 3(a)

Please refer to FIGS. 3(a)–3(c), FIG. 3(a) is a top view showing the structure of an IPS TFTLCD according to a preferred embodiment of the present invention, FIG. 3(b) and FIG. 3(c) are cross-section view taken along lines A–A' and B–B' respectively in FIG. 3 (a) according to the present invention. A liquid crystal layer 303 shown in FIG. 3(b) is filled between a first insulation substrate 301 and a second insulation substrate 302. The first insulation substrate 301 and the second insulation substrate 302 are made of a transparent glass substrate. Scanning-line electrodes 31 and a signal-line electrode 32 are crossly disposed on a first surface, right on the upside of the first insulating substrate 301 and the liquid crystal layer 303. A thin film transistor (TFT) 33 made of an ultrafilm material is mounted on the scanning-line electrodes 31, a corresponding comb-shaped pixel electrode 34 and a corresponding comb-shaped common electrode 35 are respectively formed on the first surface to form inter-fold electrodes by intending a respective teeth into the intervals formed between the pixel electrode 34 and the common electrode 35.

In this embodiment, the combination of the thin film transistor 33, the corresponding comb-shaped pixel electrode 34 and the common electrode 35 is referred as a liquid crystal controlling device. The FIG. 3(A) and FIG. 3(B) can be further understood by the following description. The gate end (not shown) and the drain end (not shown) of the TFT 33 are respectively connected to the corresponding scanning-line electrodes 31 via the corresponding signal-line electrodes 32 and the comb-shaped pixel electrode 34. The comb-shaped common electrode 35 is electrically connected to a former scanning-line electrode 31 by passing through a contact hole 351 to be further worked with the comb-shaped pixel electrode 34 to form an electric field so as to control the anti-dazzling effect in the liquid crystal layer 303.

Dramatically, there is a photoelectric converting device built on the uncontrollable region (not shown) right on the upside of the comb-shaped electrodes 34 and 35 in the present invention. The conductive layout of the photoelectric converting device shown on FIG. 3(a) has a layout in a shape corresponding to a combination region of the comb-shaped pixel electrode 34 and the comb-shaped common electrode 35.

The photoelectric converting device is formed of a photovoltaic battery 36 to be used for supplying power source, and mainly includes a first electrode 361, a photovoltaic unit 362, a highly-doped semiconductor structure 363 and a second electrode 364. An insulating layer 371 and a passivation layer 372 are formed of a insulating structure engaged between the photovoltaic battery 36 via the scanning-line electrodes and the signal-line electrodes 32 via the liquid crystal layer controlling device to achieve the purpose of insulating and protecting the structures and material as described in the photoelectric converting device.

The electrodes in the present invention including the pixel electrodes 34, common electrode 35, first electrode 361 and the second electrode 364 are transparent electrodes made of the material selected from indium tin oxide (ITO) and lead tin oxide. The insulating layer 371 is usually made of silicon oxide, silicon nitride or a combined material produced by combining the silicon oxide and silicon nitride. The photovoltaic unit 362 is made of an ultrathin film and transparent material selected from one of polysilicon and amorphous polysilicon material. And the highly-doped semiconductor structure 363 is made of a material selected from one of a group consisting of polysilicon, P type amorphous polysilicon and N type amorphous polysilicon material.

Moreover, the photovoltaic battery 36 can store the light energy, which is transmitted by the first electrode 363 and the second electrode 364 to be converted into the electrical power for a electrically connected drive IC or a chargeable battery to recycle the electrical power. And the first electrode 363 and the second electrode 364 have a layout in a shape corresponding to a combination region of the comb-shaped pixel electrode 34 and the comb-shaped common electrode 35. As a result, the photovoltaic battery in the present invention can effectively recycle the light energy in the uncontrollable region of an IPS TFTLCD.

Figure 4A:
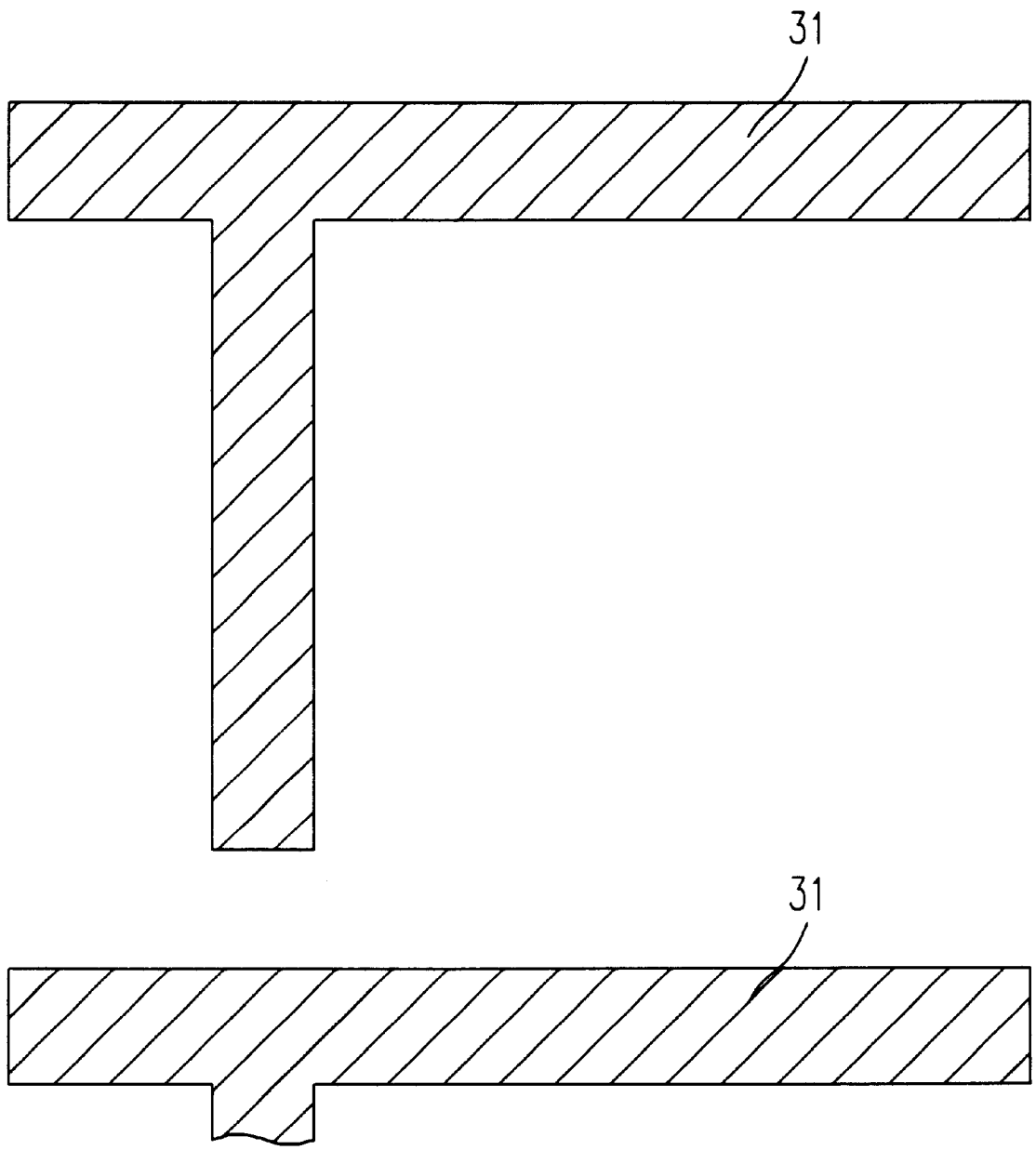
FIG. 4(a) to FIG. 4(b) are schematically show the steps of producing the IPS TFTLCD having a built-in photovoltaic battery according to the present invention.
Figure 4B:
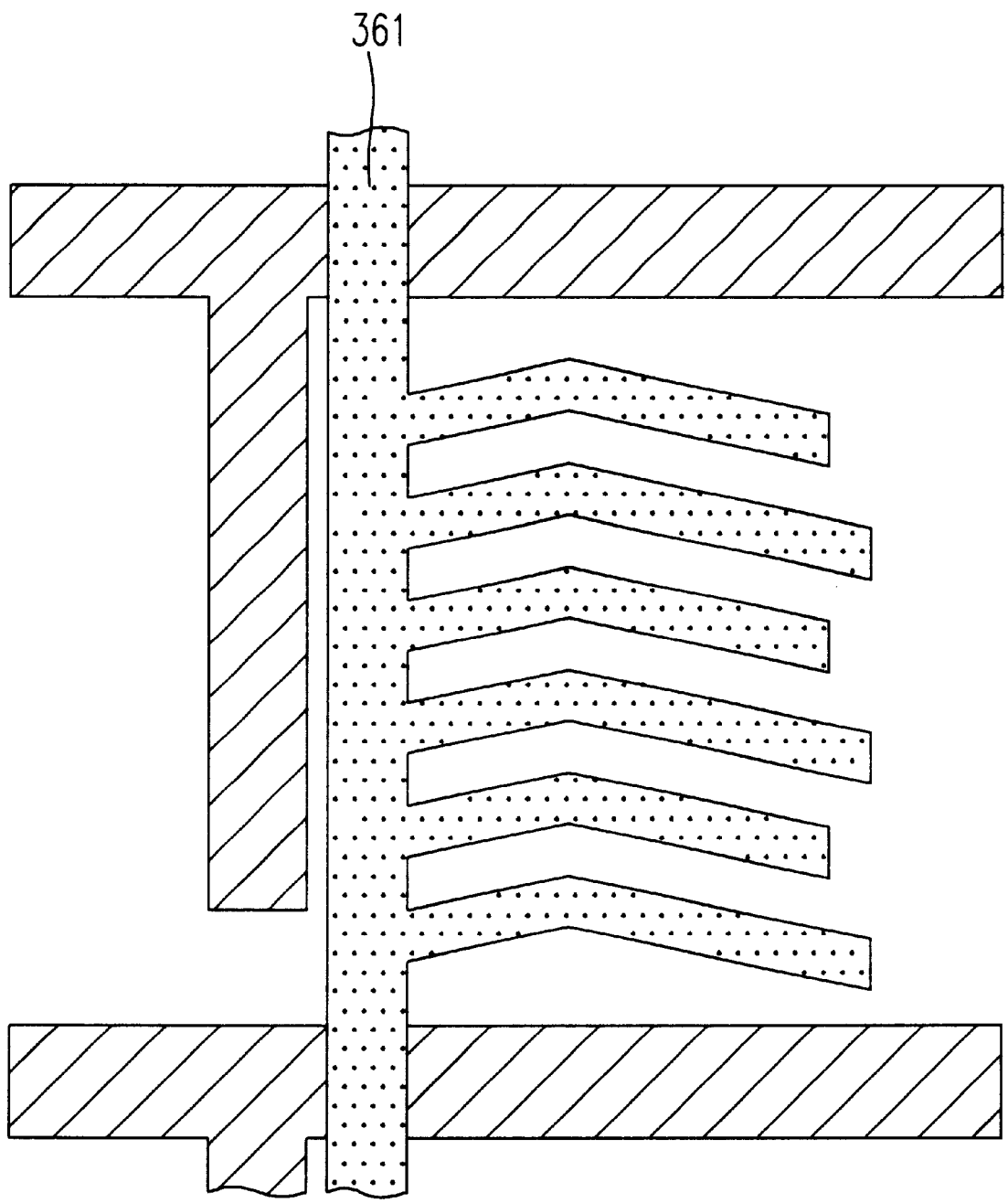
Figure 4C:
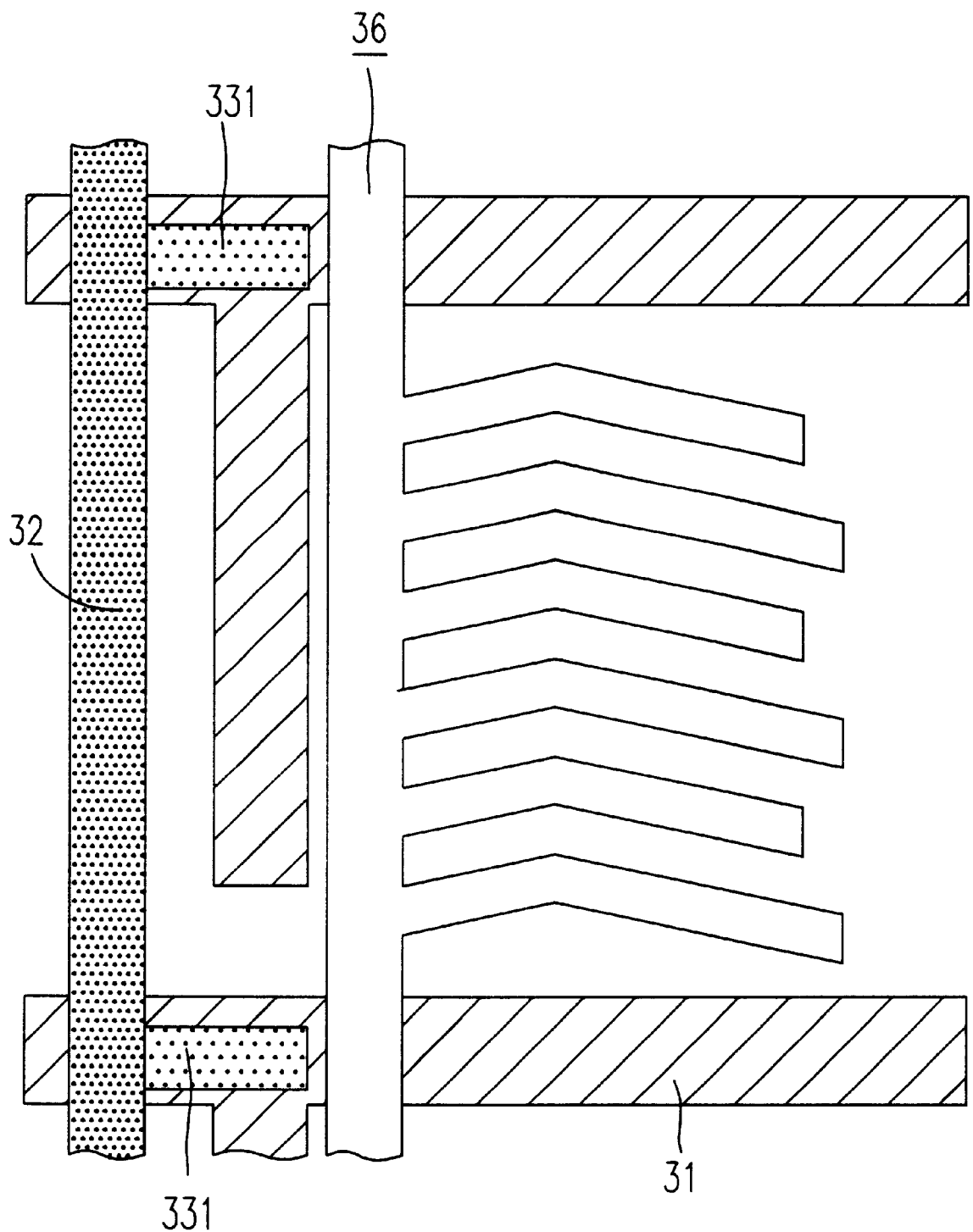

FIG. 4(a) to FIG. 4(d) schematically show the steps of producing the IPS TFTLCD having a built-in photovoltaic battery according to the present invention. In FIG. 4(a), a first conductive layout (not shown) is made of a material selected from aluminum (Al), chromium (Cr), copper (Cu), tantalum (Ta), molybdenum tungsten (MoWu) and any combined material produced by the material described above. Next, a photolithography procedure is performed to define the scanning-line electrode 31 by an etching step. The insulating layer 371 shown in FIG. 3(b) and the first electrode 361 shown in FIG. 4(b) are expressed by a depositing step. Then, a second photolithography procedure and a second etching step are performed to define a second conductive layout of the first electrode 361. A photovoltaic structure, a highly-doped semiconductor structure and a second electrode are obtained by a second depositing step. Thereafter, all the conductive layouts and the main structures in the IPS TFTLCD including the photovoltaic unit 362, the highly-doped semiconductor structure 363, the second electrode 364 and the TFT 33 consisting of a gate end, a drain end and a source end, are all obtained and defined at the same step as shown on FIG. 4(b). In addition, the signal electrode 32 is defined after the passivation layer 372 is deposited on the insulating layer 37 so as to be further connected to the drain end of TFT 33 as shown on FIG. 4(c).

Figure 4D:
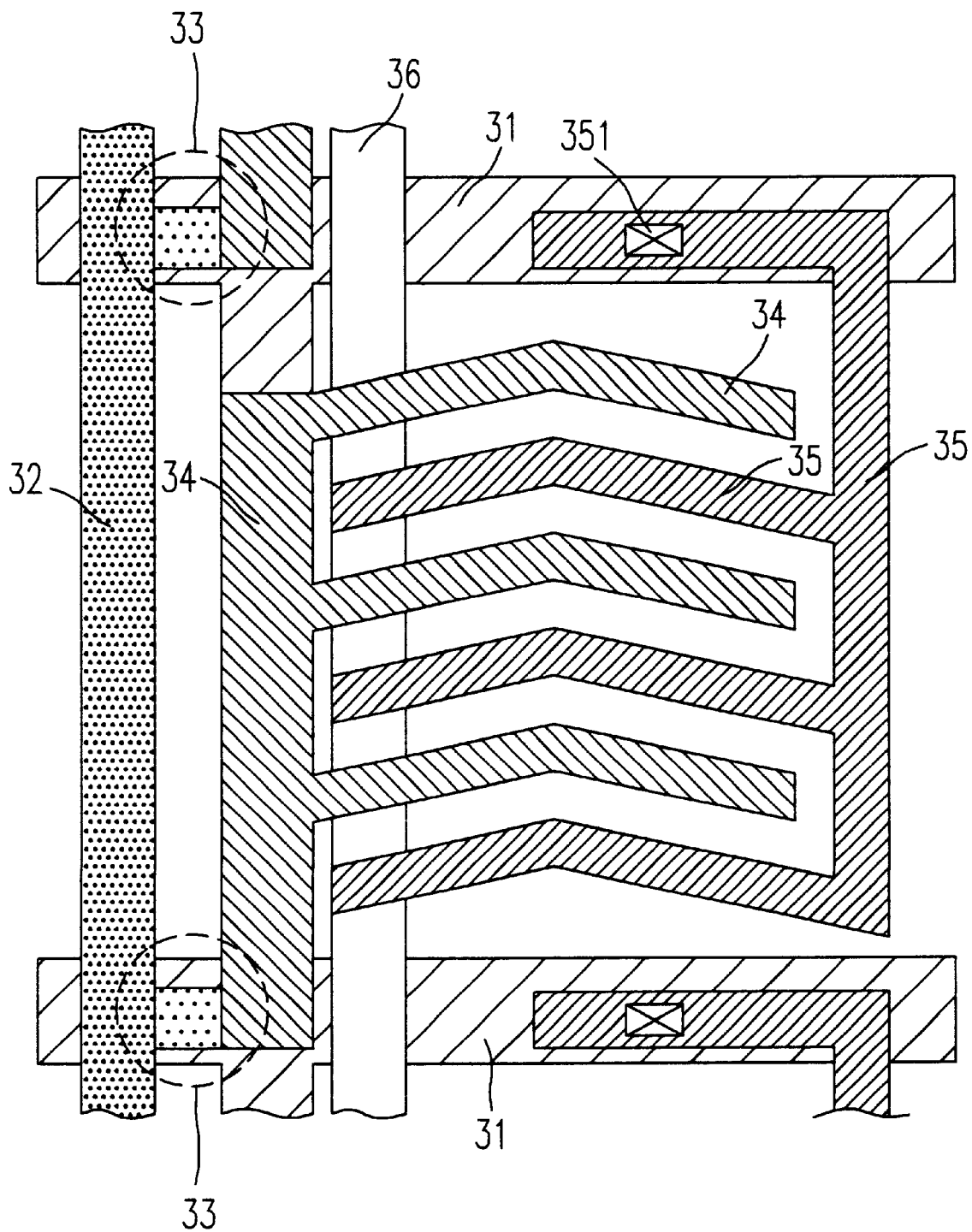

Finally, referring to FIG. 4(d) a contact hole 351, the comb-shaped pixel electrode 34 and the comb-shaped common electrode 35 are formed on the conductive layouts and the main structures as described above, and then to be respectively electrical-connected to the source end of the TFT 33 and a former scanning-line electrode 31.

Figure 5:
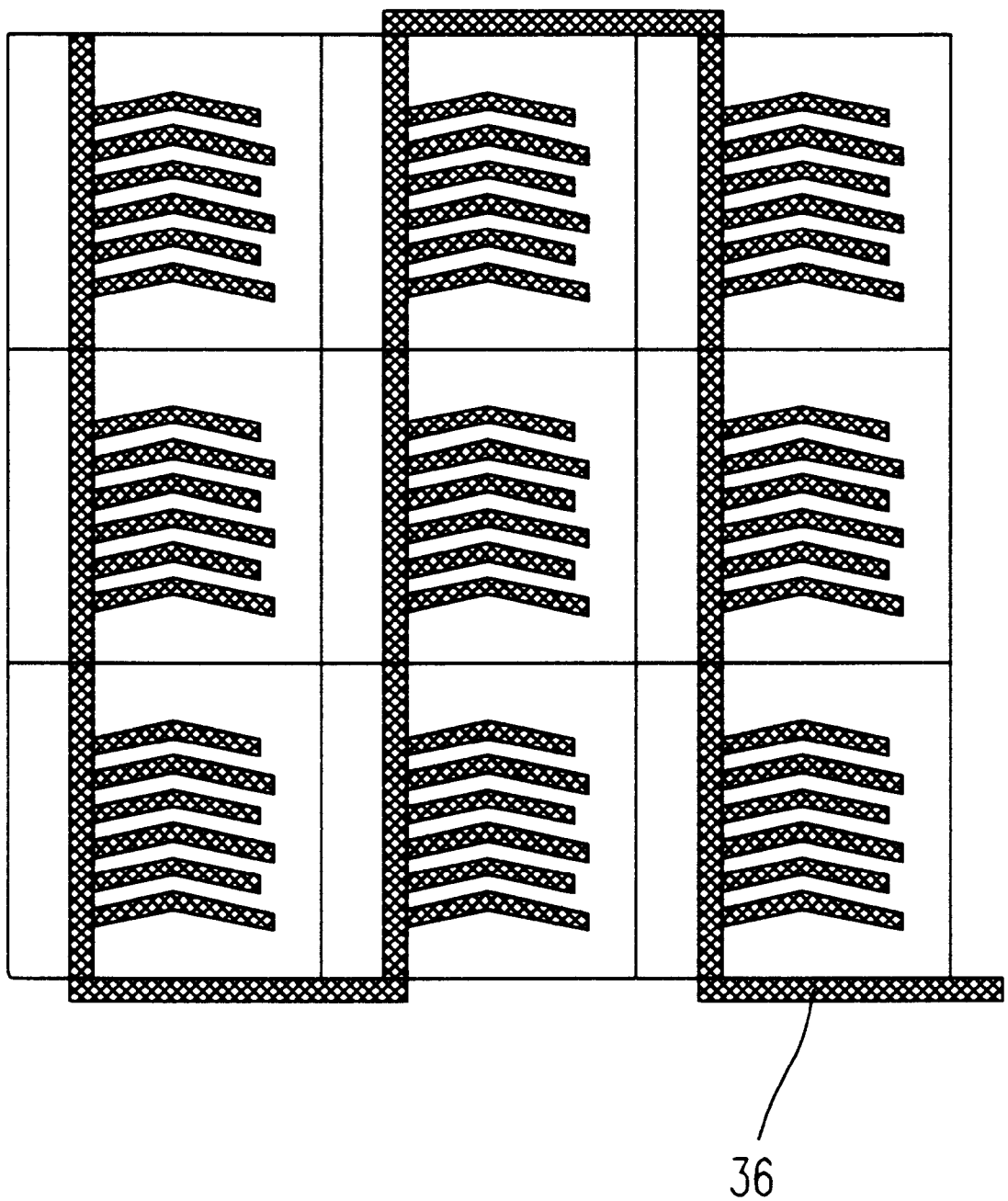
FIG. 5 shows an IPS TFTLCD designed in an S type of conductive layout according to the present invention.

Referring to FIG. 5, the conductive layout of all the photovoltaic batteries disposed in the IPS TFTLCD is designed as an "S" shape which has an advantage of reducing the length of the conductive layout so as to prevent the resistance from being overloaded. The width of the first electrode 361 or the second electrode 364 is less than 8 $\mu$m and preferably 6 $\mu$m. The space between the comb-shaped electrodes is less than 10 $\mu$m and preferably 8 $\mu$m. The width of the photovoltaic unit 362 is less than 1 $\mu$m and preferably 0.35 $\mu$m.

Accordingly, the IPS TFTLCD can completely achieve the purpose of recycling the light energy to be converted into an electric power and applied to different LCD, and express the light intensity and the contrast normally displayed on the screen by utilizing the uncontrollable region.

Additional advantages and modification will readily occur to those skilled in the art. Therefore, the invention in it broad aspects are not limited to the specific details, and representative devices shown and described herein. Accordingly various modifications may be made with out departing from the spirit or scope of the general inventive concepts as defined by appended claims and their equivalents.

What we claim is:

1. A thin film transistor liquid crystal display (TFTLCD) comprising:
   a liquid crystal layer having a first region and a second region therein;
   a liquid crystal controlling device for controlling an anti-dazzling effect by said first region of said liquid crystal layer; and
   a photoelectric converting device disposed on said second region of said liquid crystal layer for converting a portion of light energy passing through said liquid crystal layer into electrical power thereby recycling said light energy, wherein said photoelectric converting device is for a photovoltaic battery usage, comprising:
   a first electrode;
   a photovoltaic unit disposed on said first electrode;
   a doped semiconductor structure formed on said photovoltaic unit; and
   a second electrode formed on said doped semiconductor structure, wherein said first electrode and said second electrode having a layout in a shape corresponding to a combination region of said comb-shaped pixel electrode and said comb-shaped common electrode.

2. The thin film transistor liquid crystal display according to claim 1, wherein said liquid crystal layer comprises a plurality of liquid crystal molecules to be filled with said crystal layer between a first insulation substrate and a second insulation substrate.

3. The thin film transistor liquid crystal display according to claim 1, wherein said first region is a controllable region for an electrical field to control said anti-dazzling effect.

4. The thin film transistor liquid crystal display according to claim 1, wherein said second region is an uncontrollable region for setting said photoelectric converting device thereon.

5. The thin film transistor liquid crystal display according to claim 1, wherein said liquid crystal controlling device comprises:
   a pixel electrode electrically connected to a transistor for providing an electric field to control said anti-dazzling effect;
   a thin film transistor (TFT) being said transistor to be electrically connected with said pixel electrode for selectively being turned on and off; and
   a common electrode electrically connected with an end of said TFT.

6. The thin transistor liquid crystal display according to claim 5, wherein said TFT further has a gate end electrically connected with a scanning-line electrode to form said electric field.

7. The thin film transistor liquid crystal display according claim 6, wherein said scanning-electrode is electrically connected to said common electrode for further electrically connecting with said pixel electrode to form said electric field.

8. The thin film transistor liquid crystal display according to claim 5, wherein each of said pixel electrode and said common electrode is formed of a comb-shaped pixel electrode and a comb-shaped common electrode, and each of said pixel electrode and said common electrode have respective teeth set by extending into the space formed between said pixel electrode and said common electrode.

9. The thin film transistor liquid crystal display according to claim 5, wherein said pixel electrode has a layout in a shape corresponding to said common electrode.

10. The thin film transistor liquid crystal display according to claim 5, wherein said pixel electrode and said common electrode are transparent electrodes.

11. The thin film transistor liquid crystal display according to claim 10, wherein said transparency electrodes are made of a material selected from one of indium tin oxide (ITO) and lead tin oxide.

12. The thin film transistor liquid crystal display according to claim 5, wherein said liquid crystal controlling device further comprises a signal electrode and a scanning-line electrode to be respectively connected to a drain end and a gate end of said TFT.

13. The thin film transistor liquid crystal display according to claim 1, wherein said photovoltaic unit is made of an ultrathin transparent film selected from one of polysilicon and amorphous polysilicon material.

14. The thin film transistor liquid crystal display according to claim 1, wherein said doped semiconductor structure is made of a highly-doped material selected from one of a group consisting of polysilicon, P type amorphous polysilicon and N type amorphous polysilicon material.

15. The thin film transistor liquid crystal display according to claim 1, wherein said first electrode and said second electrode are transparent electrodes.

16. The thin film transistor liquid crystal display according to claim 15, wherein said transparency electrodes are formed of a same material as that of a pixel electrode and a common electrode of said liquid crystal control device, said same material selected from one of indium tin oxide (ITO) and lead tin oxide.

17. An in-plane switch (IPS) thin film transistor liquid crystal display (thin film transistor liquid crystal display) comprising:

a first insulation substrate;

a second insulation substrate;

a liquid crystal layer filled between said first insulation substrate and said second insulation substrate therein;

a plurality of scanning-line electrodes and a plurality of signal-line electrodes formed on a surface bounded between said first insulation substrate and said liquid crystal layer;

a plurality of liquid crystal controlling devices respectively formed in the common border of said scanning-line electrodes and said signal-line electrodes for controlling an anti-dazzling effect of said liquid crystal layer, each of said liquid crystal controlling units comprising:

a thin film transistor (TFT) electrically connected with said scanning-line electrodes and said signal-line electrodes;

a comb-shaped pixel electrode and a corresponding comb-shaped common electrode having a respective teeth extending into the intervals formed between said comb-shaped pixel electrode and said corresponding comb-shaped common electrode; and a photoelectric converting device disposed between said first insulation substrate and said second insulation substrate and having a layout in a shape corresponding to a combination region of said comb-shaped pixel electrode and said comb-shaped common electrode.

18. The in-plane thin film transistor liquid crystal display according to claim 17, wherein said first insulation substrate and said second insulation substrate are respectively made of a transparency glass substrate.

19. The in-plane thin film transistor liquid crystal display according to claim 17, wherein each of said pixel electrode and said common electrode is formed of a transparent electrode.

20. The in-plane thin film transistor liquid crystal display according to claim 17, wherein said TFT has a gate end electrically connected to an end of a corresponding one of said scanning-line electrodes and a drain end electrically connected to an end of a corresponding one of said signal electrodes.

21. The in-plane thin film transistor liquid crystal display according to claim 17, wherein said comb-shaped pixel electrode and said comb-shaped common electrode are respectively electrical-connected to a source end of said TFT and a former scanning-line electrode neighboring-disposed to said scanning-line electrode.

* * * * *